United States Patent
Suzuki et al.

(10) Patent No.: US 6,984,189 B2
(45) Date of Patent: Jan. 10, 2006

(54) FRICTION TRANSMISSION UNIT

(75) Inventors: Tomohiro Suzuki, Aichi (JP); Shuzo Sanda, Aichi (JP); Takanori Abekura, Aichi (JP); Kazuyoshi Ogawa, Aichi (JP); Masataka Osawa, Aichi (JP); Masakatsu Kuroishi, Aichi (JP); Toshinari Sano, Susono (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 56 days.

(21) Appl. No.: 10/067,903

(22) Filed: Feb. 8, 2002

(65) Prior Publication Data

US 2003/0040400 A1  Feb. 27, 2003

(30) Foreign Application Priority Data

Aug. 10, 2001  (JP) .............................. 2001-243268

(51) Int. Cl.
*F16H 15/38* (2006.01)
(52) U.S. Cl. .......................................... 476/73; 476/40
(58) Field of Classification Search ................. 476/72, 476/73, 40, 42
See application file for complete search history.

(56) References Cited

U.S. PATENT DOCUMENTS

| | | | | |
|---|---|---|---|---|
| 1,250,959 A | * | 12/1917 | Brown ......................... | 476/72 |
| 2,020,677 A | * | 11/1935 | Erban .......................... | 476/72 |
| 2,734,389 A | * | 2/1956 | Strecker ....................... | 476/39 |
| 4,909,092 A | * | 3/1990 | Machida et al. .............. | 476/46 |
| 5,263,907 A | * | 11/1993 | Fellows ....................... | 476/40 |
| 5,916,057 A | * | 6/1999 | Waltz et al. .................. | 476/40 |
| 6,482,121 B2 | * | 11/2002 | Okoshi ........................ | 476/65 |

FOREIGN PATENT DOCUMENTS

| | | | |
|---|---|---|---|
| JP | 10-89431 | | 4/1998 |
| JP | 11-82659 | * | 3/1999 |
| JP | 11-141636 | * | 5/1999 |

* cited by examiner

*Primary Examiner*—William C Joyce
(74) *Attorney, Agent, or Firm*—Oblon, Spivak, McClelland, Maier & Neustadt, P.C.

(57) ABSTRACT

A friction transmission unit for transmitting power between input and output members by means of friction and capable of loss reduction and large torque transmission. Power is transmitted between a planar disk (16) and a roller (10), which contacts the upper surface of the planar disk (16). The profile of the peripheral surface (14) of the roller (10) which actually contacts the upper surface (20) of the disk (16) is expressed as $z = a \cdot \sin h(bx^2)$. This profile realizes a contact stress distribution which is constant over an area corresponding to approximately 80% in the width direction of the entire contact region. This profile also prevents formation of peak stresses near and at the edges of the contact region and, instead, enables formation of monotonic decrease of stress in areas near the edges.

4 Claims, 21 Drawing Sheets

SPEED CHANGING STATE

OPTIMIZED AT INNERMOST POSITION(A)

FRICTION TRANSMISSION UNIT

BACKGROUND OF THE INVENTION

1. Field of the Invention

The present invention relates to a friction transmission unit for transmitting rotational force of an input member to an output member by means of friction force, and in particular to the profile of the contact portions of the input and output members.

2. Description of the Related Art

In known friction transmission units, power is transmitted from one to another of two members which are in rolling contact by means of friction force caused between the contact portions of the two members. The friction force is substantially proportional to a normal force acting on the contact surfaces of the two members. That is, the larger the force to press the two members together, the larger the power to be transmitted. Meanwhile, the associated increased contact stress caused by the greater force pressing the two members together may cause wearing-out at or below the surfaces of the members. The wearing-out can be reduced by employing a larger contact area thereby reducing contact stress. However, when the relative velocity between the two members within the contact region is not constant, the difference between the velocity increases, causing problems such as wearing-out, heat generation, and reduction of transmission efficiency.

Thus, in a structure in which constant relative velocity is not obtained within the contact region, a smaller contact region and smaller contact stress are preferable. These can be achieved using a known method for attaining constant stress distribution in the contact region. An example profile of the contact portions of the two members which satisfy this condition is disclosed in Japanese Patent Laid-open Publication No. Hei 10-89431, which suggests a contact portion having a Lundberg's profile.

The Lundberg's profile, as disclosed in the above-mentioned application, however, has a problem that it does not, in fact, attain constant stress distribution and, thus, does not realize sufficiently significant reduction of contact stress. Lundberg's profile has another problem that stress peaks in areas near the edges of the contact region, where the relative velocity is relatively high.

Further, should the portion of at least one of the input and output members be changed, conditions of the contact region also changes. The above-cited application does not disclose information concerning design conditions, including a most preferable position wherein the profile of a contact portion should be optimized.

SUMMARY OF THE INVENTION

The present invention has been conceived in view of the above and aims to provide a contact portion of a friction transmission unit having a profile which enables more constant stress distribution, reduced wear, and improved transmission efficiency.

In order to achieve the above objects, according to the present invention, there is provided a friction transmission unit comprising rotating input and output members having contact portions. The profile of the contact portions on a plane vertical to a vector of a friction force caused between the input and output members is as follows. That is, the profile defined by a function indicating an assumed gap z formed between the input member and the output member when pressed into contact by an applied load is a profile other than a circular arc profile, the gap z being on a plane vertical to a vector indicating friction force caused between the input member and the output member. The profile other than a circular arc profile is defined by a shape of contact stress distribution which monotonically decreases in areas near edges of a contact region on the plane vertical to a vector indicating the friction force, the shape of contact stress distribution being a shape formed when a substantially rated load is applied to the input member and the output member. The contact stress monotonically decreases in area near the edges.

Further, preferably, the contact stress maybe substantially constant at and around the center of the contact region.

More specifically, the profile of the contact portions of the input and output members on a plane vertical to friction force between the input and output member is expressed as $$Z = a \cdot \sin h(bx^2),$$

wherein z represents a gap between the input and output members contacting each other at a point; and x represents a distance from a contact point at which the input member contacts the output member along a tangent passing through the contact point. The profile expressed by this expression realizes constant stress distribution and high transmission efficiency.

Also, the above-mentioned function can be expressed using a quartic function as $$z = C_4 x^4 + C_3 x^3 + C_2 x^2$$

wherein $C_4 = (-0.00002n^4 + 0.0017n^3 - 0.058n^2 + 0.89n - 2.113) \times C_0$ $C_3 = (-0.0018n^3 + 0.064n^2 - 1.0754n + 3.7603) \times C_0$ $C_2 = (1.894n^{-0.574} - C_4 - C_3) \times C_0$ $$C_0 = \frac{2aP\max}{\pi E}$$

$3 \leq n \leq 6$ (full-troidal)

$3 \leq n \leq 10$ (half-troidal)

According to another aspect of the present invention, there is provide a method for designing a friction transmission unit comprising an input member and an output member which are in rolling contact each other, in which fluid is supplied at and around a point of contact between the input member and the output member so that power is transmitted by means of rolling and slipping of the input member and the output member and by means of shearing of the fluid.

This method comprises a function computing step of computing a function indicating a gap z which is formed between the input member and the output member when the input member and the output member are assumed to contact each other at one point, the gap z being on a plane vertical to a vector indicating friction force caused between the input member and the output member; and a step of obtaining a profile of contact surfaces of the input member and the output member based on the function indicating the gap z. Further, the function computing step includes a contact stress distribution computing step of computing contact stress distribution at and around the point of contact between the input member and the output member and a transmission loss based on high pressure shearing characteristics of the fluid to select a contact stress distribution having a shape which substantially minimizes the transmission loss, and a step of computing a function indicating the gap z which realizes the contact stress distribution selected based on an elastic dynamic expression.

Further, according to this design method, the function indicating the gap z can be computed by approximating a function $$z = C_4 x^4 + C_3 x^3 + C_2 x^2$$

wherein $C_4 = (-0.00002n^4 + 0.0017n^3 - 0.058n^2 + 0.89n - 2.113) \times C_0$
$C_3 = (-0.0018n^3 + 0.064n^2 - 1.0754n + 3.7603) \times C_0$
$C_2 = (1.894n^{-0.574} - C_4 - C_3) \times C_0$ $$C_0 = \frac{2aP\max}{\pi E}$$

$3 \leq n \leq 6$ (full-troidal)
$3 \leq n \leq 10$ (half-troidal)

Still further, when the position where the input and output members contact through rolling is changed, a function indicating the gap z can be computed at a point of contact between the input member and the output member where the curvature radius of at least one of the input and output members in the direction indicating friction force caused between the input and output members is minimized. At this point, the contact region is largest in the width direction, or the direction vertical to the vector indicating the friction force. If a desired stress distribution is realized at this point, substantially preferable stress distribution can be realized with a smaller width. As a result, preferable stress distribution can be realized throughout the entire region in which the contact position changes.

When one of the input and output members has a troidal surface, a function indicating the gap z can be computed at a point of contact which is innermost in the radius direction of the troidal surface within a range wherein the other member contacts on the troidal surface.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENTS

In the following, embodiments of the present invention will be described with reference to the drawings.

Figure 1:
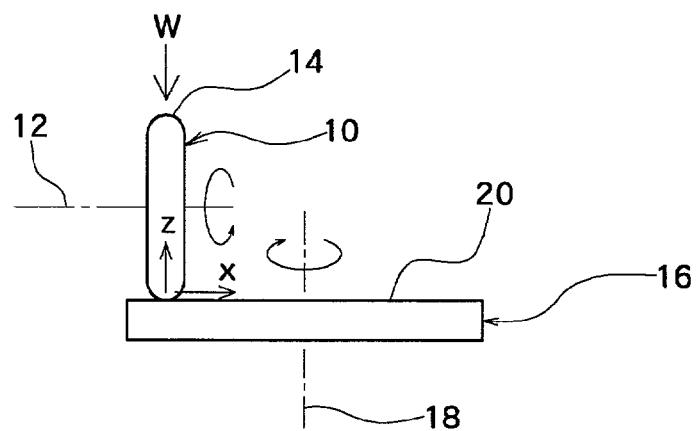
FIG. 1 is a schematic diagram showing a structure associated with power transmission by a friction transmission unit.

FIG. 1 is a schematic diagram showing a structure associated with power transmission by a friction transmission unit. A roller 10 is a disk having a certain thickness and rotating around a roller axis 12, the peripheral surface 14 of which is formed having a predetermined curved surface. A disk 16 is a disk rotating around a disk axis 18, the upper surface of which is a plane vertical to the axis 18 in the drawing. The axes 12, 18 are positioned so as to vertically intersect. The peripheral surface 14 of the roller contacts the upper surface 20 of the disk such that power is transmitted between the roller 10 and the disk 16 by means of friction force caused between the respective contacted portions. In the following description, the peripheral surface 14 of the roller is referred to as a roller power transmitting surface 14, and the upper surface 20 of the disk is referred to as a disk power transmitting surface 20, both being surfaces effecting power transmission.

Figure 2:
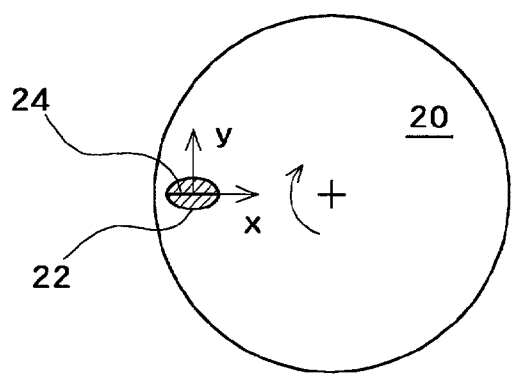
FIG. 2 is a diagram showing an upper surface 20 of a disk

FIG. 2 is a top view of the disk 16 of FIG. 1, showing a contact region 22 where the power transmitting surfaces 14, 20 of the roller 10 and the disk 16, respectively, contact each other being applied by a load W (see FIG. 1). In a power transmission system having a structure of this embodiment, in which a contact central line 24, which is an orthogonal projection of the roller or disk axis 12 or 18 relative to the contact region 22, does not intersect the roller and disk axes 12, 18 at one point, the relative velocity within the contact region 22 does not remain constant.

Figure 3:
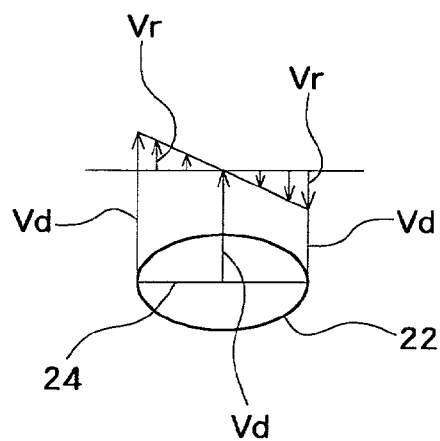
FIG. 3 is a diagram showing velocity distribution within a contact region.

FIG. 3 illustrates the state of such variable relative velocity within the contact region 22. In the following description, the direction of the contact central line 24 of the contact region 22 is referred to as a width direction, while the direction vertical to the width direction is referred to as a power transmitting direction. The velocity Vd of the disk power transmitting surface 20 is represented in the form of a vector along the power transmitting direction and increases closer to the periphery of the disk. However, the velocity of the roller power transmitting surface 14 remains constant in the width direction. As a result, the relative velocity Vr of these velocities is opposite on both sides of the center of the contact region 22, which creates a spin moment. The spin moment may in turn cause a loss, deteriorating transmission efficiency. Where the relative velocity Vr is larger farther from the center of the contact region 22, the larger the contact region 22 in the width direction, the larger the loss caused due to spins. Therefore, in order to reduce a loss due to spin, the width of the contact region 22 must be reduced.

Meanwhile, a larger maximum contact stress caused in the contact region 22 may in turn cause the power transmitting surfaces 14, 20 to wear out due to fatigue. To prevent this, it is preferable that the maximum contact stress be reduced. A smaller maximum contact stress may also enable an increase of the load W, allowing transmission of a larger torque.

In light of the above, satisfaction of the two demands, namely, under a constant load W, reduction of the width of the contact region 22 and reduction of a maximum contact stress, has been desired. In order to satisfy both demands, a constant stress distribution in the width direction within the contact region 22 is required. This, in turn, requires determining profiles of the roller and disk power transmitting surfaces 14, 20 which enable such stress distribution.

In this embodiment, providing that the disk power transmitting surface 20 is planar, the profile of the power transmitting surface 14 is considered. The profile of the roller power transmitting surface 14 refers to the cross section of the roller 10 which contains the roller axis 12. This profile is expressed in a coordinate system described below. Specifically, the origin O is the center of the contact region 22, that is, a point at which the roller 10 contacts the disk 16 when the roller 10 is pressed onto the disk 16 as being applied by a load W 0; the x axis coincides with the contact central line 24, being positive in the direction toward the axis 18; the y axis extends along the power transmitting direction, or the direction of friction force, being positive in the direction of the velocity Vd of the disk power transmitting surface at the origin O; and the z axis is determined so as to constitute a right-hand orthogonal coordinate system relative to the x and y axes determined as noted above. The resultant z axis extends penetrating the sheet of FIG. 2, being positive closer to the reader.

Figure 4:
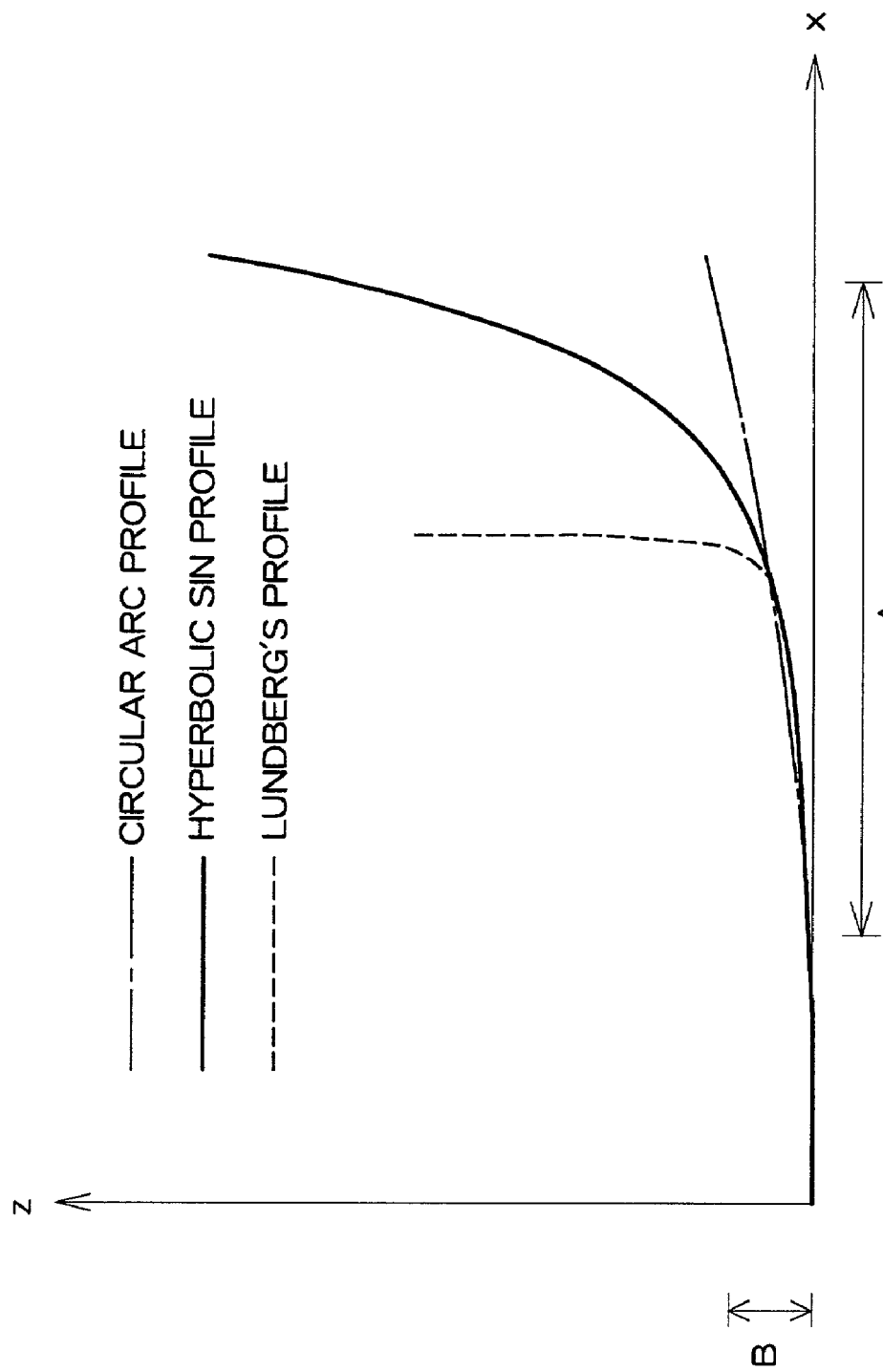
FIG. 4 is a diagram showing exemplary profiles of a power transmitting surface.
Figure 5:
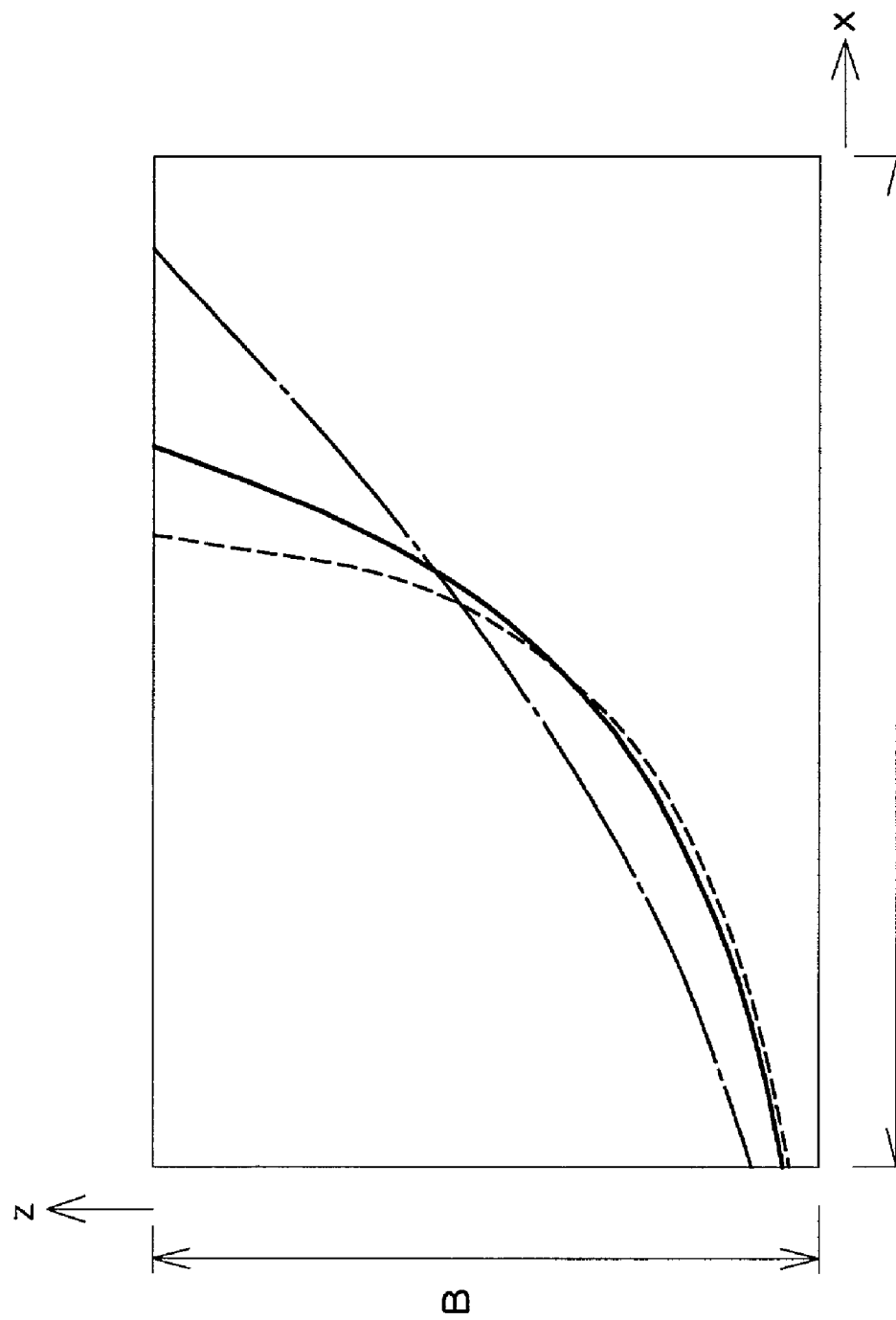
FIG. 5 is an enlarged diagram of FIG. 4.

FIGS. 4 and 5 show a cross section, or profile, of the roller power transmitting surface 14. FIG. 5 in particular is an enlarged diagram showing the portion enclosed by the range A in the x-axial direction and B in the x-axial direction in FIG. 4. In the drawings, the one dot broken line represents a circular arc profile, or a most common profile; the broken lines represents Lundberg's profile, which is proposed in the patent application mentioned above. The solid line represents a profile in the embodiment, which is a hyperbolic sin profile expressed as expression (1)

$$z = a \cdot \sin h(bx^2) \tag{1}$$

Figure 6:
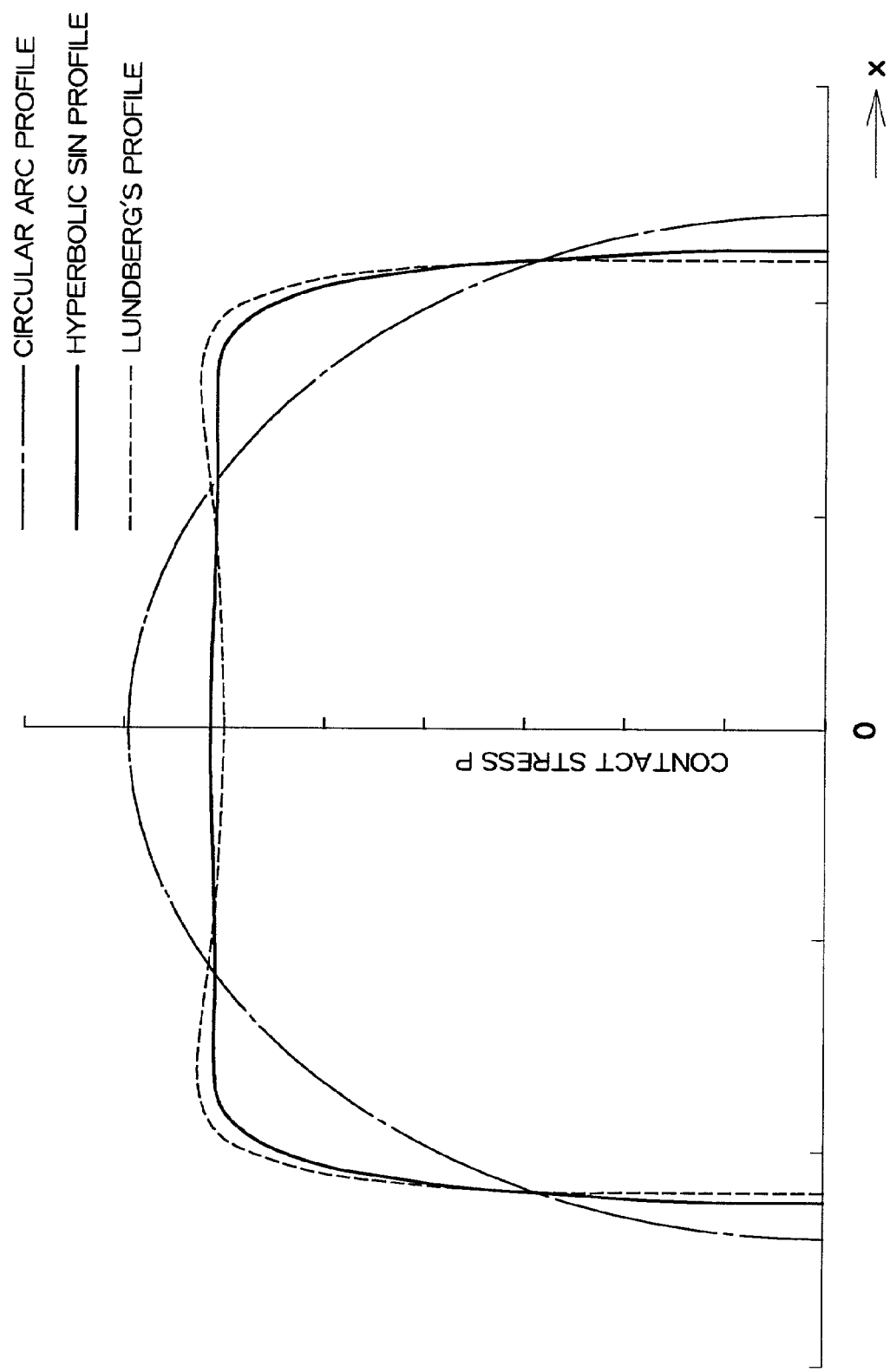
FIG. 6 is a diagram showing shapes of contact stress distribution in the width direction.

FIG. 6 is a diagram showing shapes of contact stress P distributions in the width direction (the x axial direction) of the contact region 22 which are caused when an identical load W is applied using rollers 10 having profiles shown in FIGS. 4 and 5. The respective lines in the drawing represent the respective profiles similarly described above. As shown, for a circular arc profile, the largest contact stress P occurs around the center of the contact region while, for a Lundberg's profile, the contact stress P peaks in areas near the edges of the contact region. Meanwhile, the profile of this embodiment (a hyperbolic sine profile) produces constant stress distribution across the majority (approx. 80%) of the contact region with stress monotonically decreasing toward the edges of the region. The maximum contact stress resulting with the hyperbolic sine profile is smaller than would result with either a circular arc or a Lundberg's profile. Conclusively, the profile in this embodiment can satisfy to a high degree the above-described demands on the power transmitting surface of a friction transmission unit, where spines maybe caused.

Figure 7:
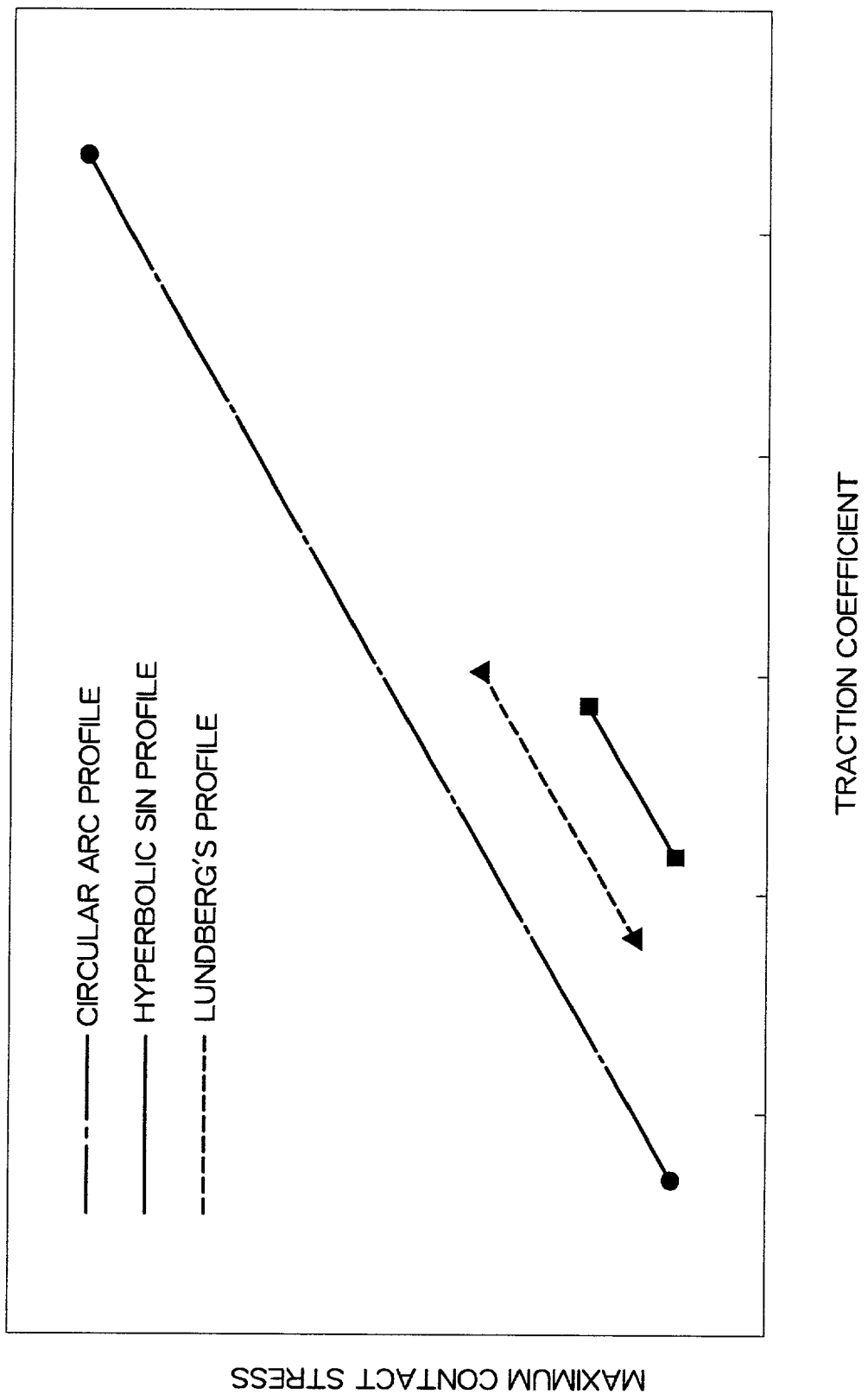
FIG. 7 is a diagram showing relationships between a traction coefficient and maximum contact stress.

FIG. 7 shows changes of traction coefficients and maximum contact stresses resulting from changes in roller profiles, which may affect the width of contact of rollers having respective profiles described above. The larger the traction coefficient, the higher the transmission efficiency, that is, the smaller spin loss. A larger traction coefficient, which allows transmission of a larger torque, and a smaller maximum contact stress are preferable. In other words, combinations of traction coefficients and maximum contact stresses relative to profiles which fall on the lower right area of the graph of FIG. 7 are preferable. For a circular arc profile, represented by the one dot broken line in the drawing, the line corresponds to smaller curvatures as it goes upper right. For the hyperbolic sine profile, the line corresponds to larger coefficients a as it extends to the upper right. For the Lundberg's profile, points where the diameter of a reference circle is changed are plotted in the drawing. In light of the above, it can be seen from the graphs that a hyperbolic sine profile is preferable as the associated line locates further below and to the right of the plots for the other profiles.

Figure 8:
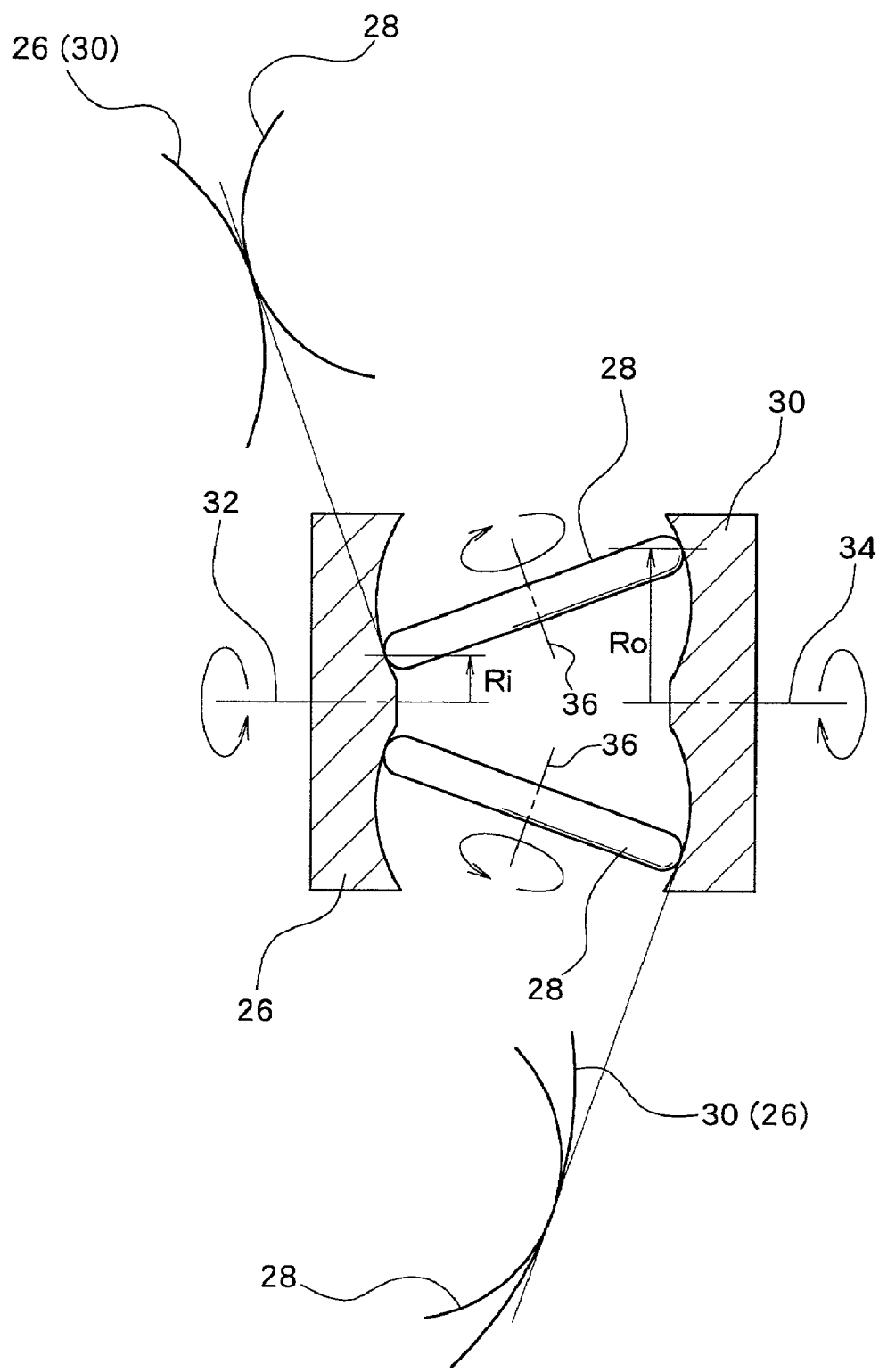
FIG. 8 is a diagram showing a structure of key elements of a speed changing unit having a friction transmitting mechanism.

FIG. 8 schematically shows a structure of a speed changing mechanism of a full-troidal, in which the rotation of an input disk 26 is transmitted via a power roller 28 to an output disk 30. The shapes of the input disk 26 and the output disk 30 are the shapes which would be formed by rotating the illustrated profiles around the respective axes 32, 34. The power roller 28 also rotates around the axis 36, which inclines continuously changeable on the sheet of FIG. 8. Between the input disk 26 and power roller 28, and between the power roller 28 and output disk 30, power is transmitted by means of friction force. In view of the example described above, the peripheral surface of the power roller 28 corresponds the roller power transmitting surface, and the surfaces of the input and output disks 26, 30 which oppose the power rollers 28 in FIG. 8 correspond to the disk power transmitting surface. Where the distance between the axis 32 and the center of a contact region where the input disk 26 contacts the power roller 28 is denoted as an input radius Ri and where the distance between the axis 34 and the center of a contact region where the output disk 30 contacts the power roller 28 is denoted as an output radius Ro, the ratio Ro/Ri constitutes a speed changing ratio. Change in inclination of the power roller 28 causes the input and output radii Ri, Ro and thus the speed changing ratio to change. As the inclination of the power roller 28 can be continuously changed, the speed changing ratio can also be changed continuously.

In the above example, the profiles of the power transmitting surfaces of the power roller 28 and input and output disks 26, 30 are determined as follows. That is, a gap between these power transmitting surfaces is denoted as z; a point at which the surfaces contact each other as being applied by a load 0 is determined to be an origin; and the tangent of the power transmitting surfaces at the point of contact is denoted as x. Then, the profile of the power transmitting surfaces is determined such that the gap z is expressed as a function expressed by the above described expression (1). Because the input and output disks 26, 30 must always contact the power roller 28, even though the inclination of the power roller 28 should change, the disk power transmitting surfaces have a circular arc shape in the sectional view of FIG. 8. Thus, the power transmitting surface of the power roller 28 is determined such that it has a gap z relative to the circular arc disk power transmitting surfaces expressed by expression (1). With the above arrangement, demands on a friction transmission mechanism, namely, fewer spins and a smaller maximum contact stress, can be satisfied to a high degree.

In the speed changing mechanism of FIG. 8, the contact surfaces of the input and output disks 26, 30 have curvature in the y-axial direction in which the power roller 28 rotates. In the example of FIG. 8, the curvature radii of the contact surfaces at the point of contact where the power roller 28 is held in horizontal orientation, that is, where the radii of the input and output disks Ri, Ro are identical (a central position) are infinite. In other words, the surfaces are then planar. For a point of contact outside relative to the central point (see the power roller 28 and the output disk 30 in FIG. 8), the power roller 28 is inscribed in the curved surface of the output disk 30. For a point of contact inside relative to the central point (see the power roller 28 and the input disk 26 in FIG. 8), on the other hand, the power roller 28 circumscribes the curved surface of the input disk 26.

Figure 9:
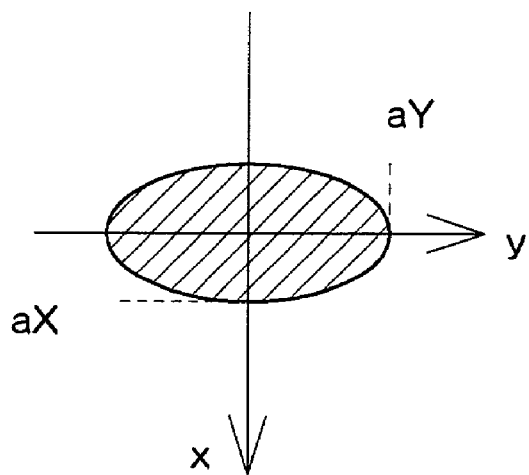
FIG. 9 is a diagram showing an exemplary shape of a contact region.
Figure 10:
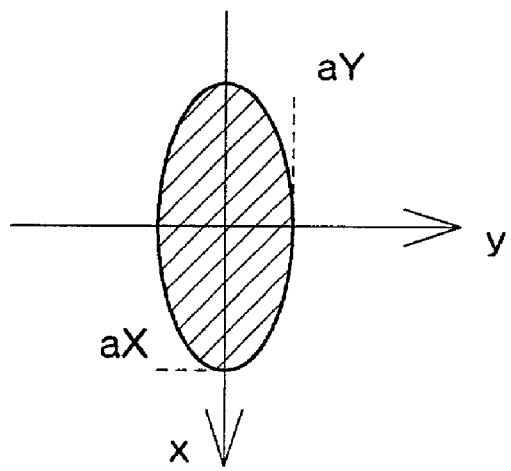
FIG. 10 is a diagram showing an exemplary shape of a contact region.

For a point of contact closer to the outside relative to the central point, the contact region, the striped region in the drawings, where the input and output disks 26, 30 contact the power roller 28, has a longer contact length aY in the y axial direction and a shorter contact length aX in the x axial direction, as shown in FIG. 9. For a point of contact closer to the inside relative to the central point, the contact region has a longer contact length aX in the x axial direction, as shown in FIG. 10.

Figure 11:
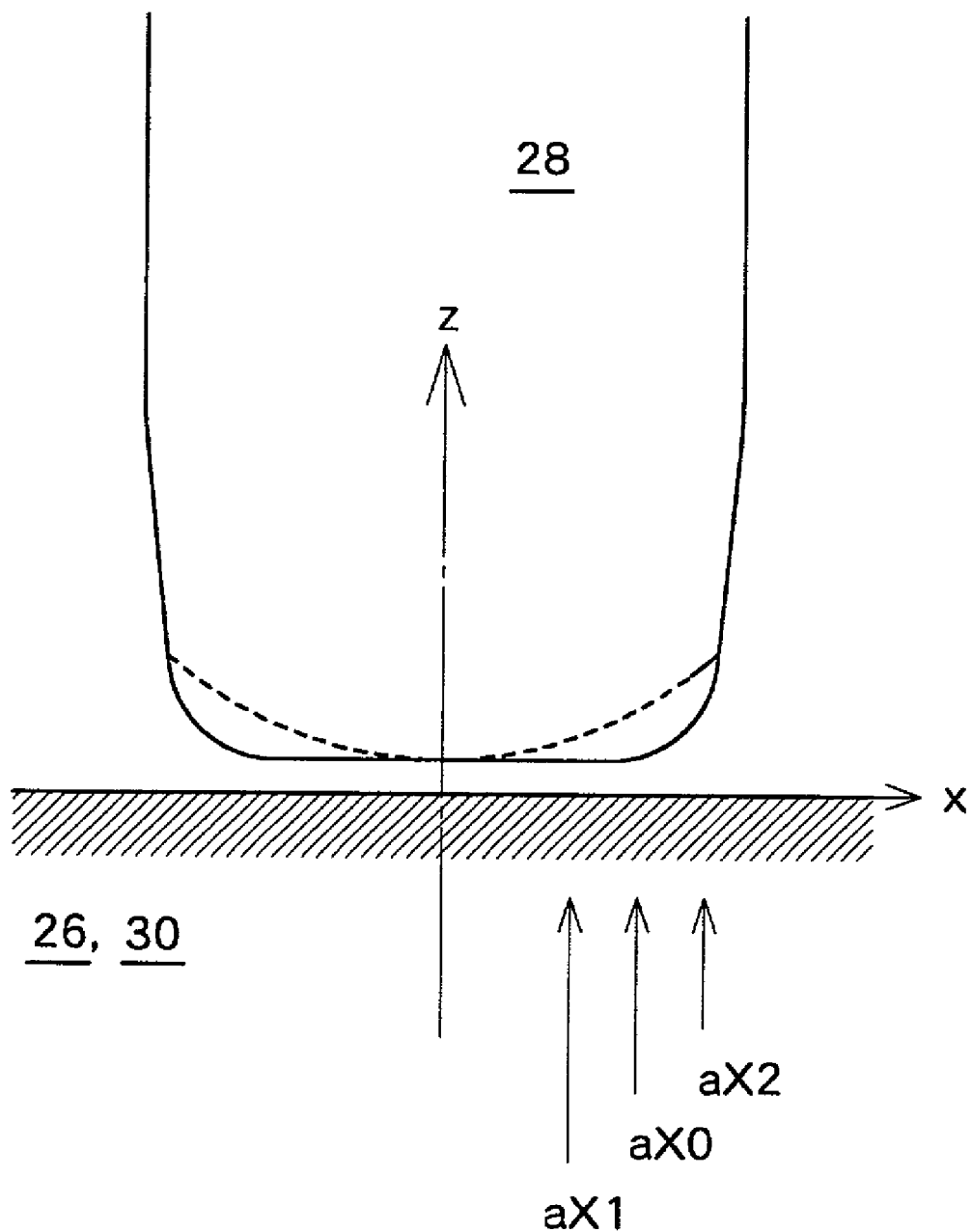
FIG. 11 is a diagram showing profiles of a roller and a disk and the width of contact between them.
Figure 12:
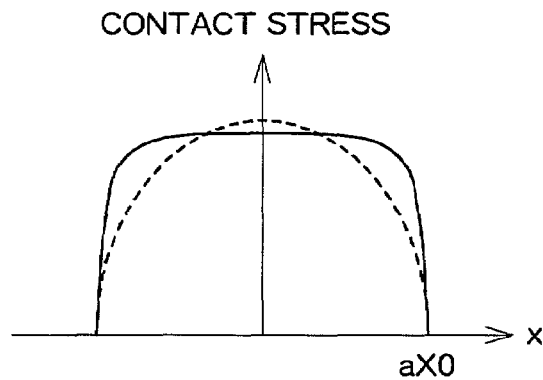
FIG. 12 is a diagram showing a shape of contact stress distribution with the width of contact aX0 of FIG. 11.
Figure 13:
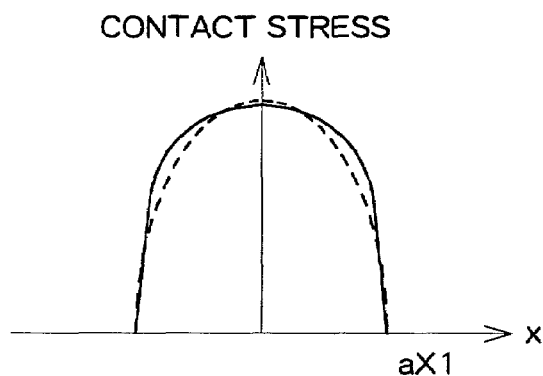
FIG. 13 is a diagram showing a shape of contact stress distribution with the width of contact aX1 of FIG. 11.
Figure 14:
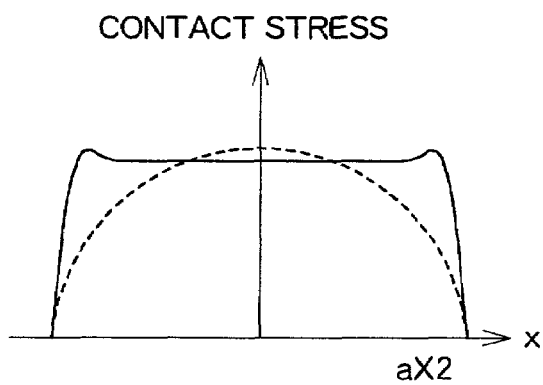
FIG. 14 is a diagram showing a shape of contact stress distribution with the width of contact aX2 of FIG. 11.

FIG. 11 is a vertical cross section across the y axis, showing the point of contact and its surrounding region between the input and output disks 26, 30 and the power roller 28. In the drawing, the broken line represents a cross section relative to a circular arc profile, while the solid line represents a cross section relative to a profile in this embodiment, which results in stress distribution having a relatively flat shape within the contact region. The shape of the solid line is obtained when optimization is applied with the width of contact aX0. FIG. 12 shows the shape of a contact stress distribution with the width of contact aX0. FIG. 13 shows the shape of contact stress distribution with the width of contact aX1, which is smaller than aX0, and FIG. 14 shows the shape of contact stress distribution with the width of contact aX2, which is larger than aX0. In the respective drawings, the solid line represents stress distribution associated with the profile in this embodiment, while the broken line represents that associated with a circular arc profile.

As can be seen from FIGS. 12 to 14, it will be appreciated that the width of contact larger than the width of contact aX0, which is used for optimization, will lead to stress formation in areas near the edges of the width of contact which is larger than would be caused with a circular arc profile. To the contrary, a width of contact smaller than the width of contact aX0 can produce a stress distribution which is more preferable, that is, which has a smaller maximum stress value than would be produced with a circular arc profile. In light of the above, when conditions of the width of contact vary, optimization is preferably applied at the upper limit of the changing width of contact to produce a stress distribution across the entire range of variations more preferable than the profile which would result from a circular arc profile.

Figure 15:
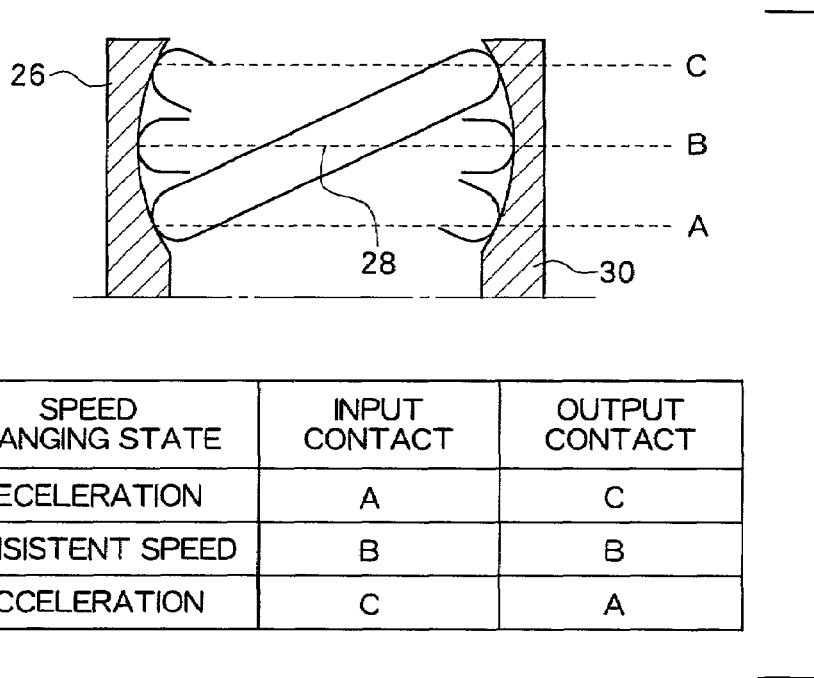
FIG. 15 is a diagram showing the state of changing speed by a full-troidal speed changing mechanism.

FIG. 15 is a diagram showing an exemplary state of speed variation of the troidal speed changing mechanism shown in FIG. 8. The speed changing mechanism is in a decelerating state when the input radius Ri is smaller than the output radius Ro, in an accelerating state when the input radius Ri is larger than the output radius Ro, and operating with a uniform speed when the input radius Ri is equal to the output radius Ro.

Figure 16:
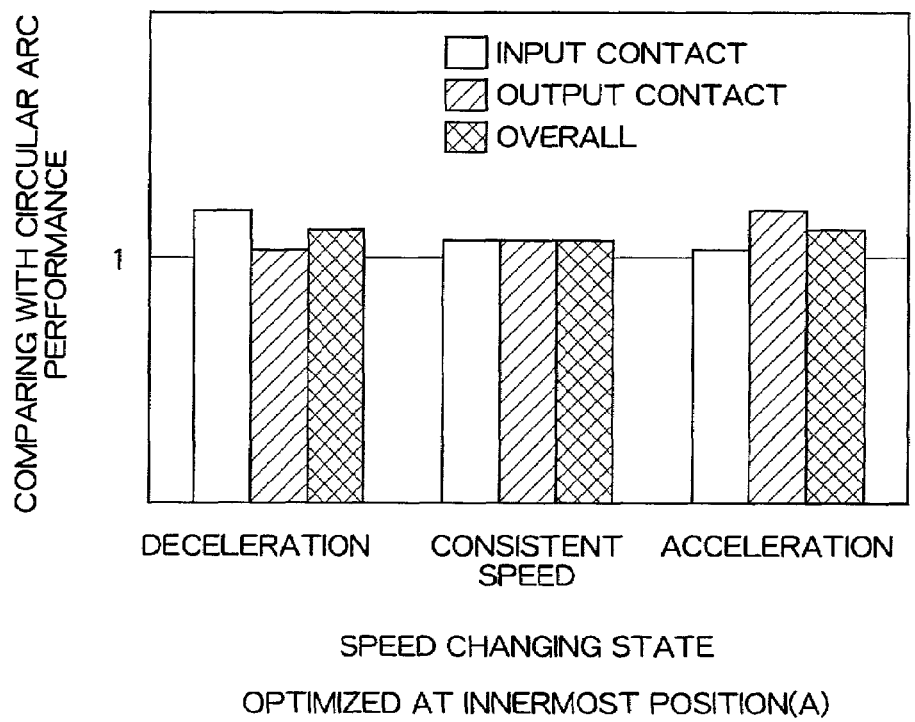
FIG. 16 is a diagram showing performance obtained using a roller the profile of which is designed at the innermost position in a full-troidal speed changing mechanism.
Figure 17:
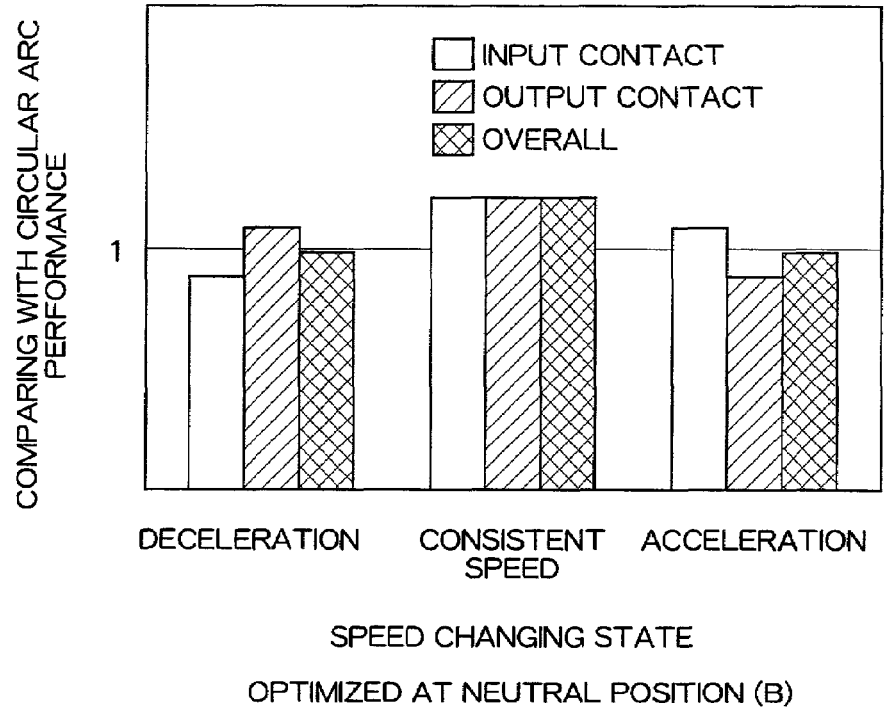
FIG. 17 is a diagram showing performance obtained using a roller the profile of which is designed at a central position in a full-troidal speed changing mechanism.
Figure 18:
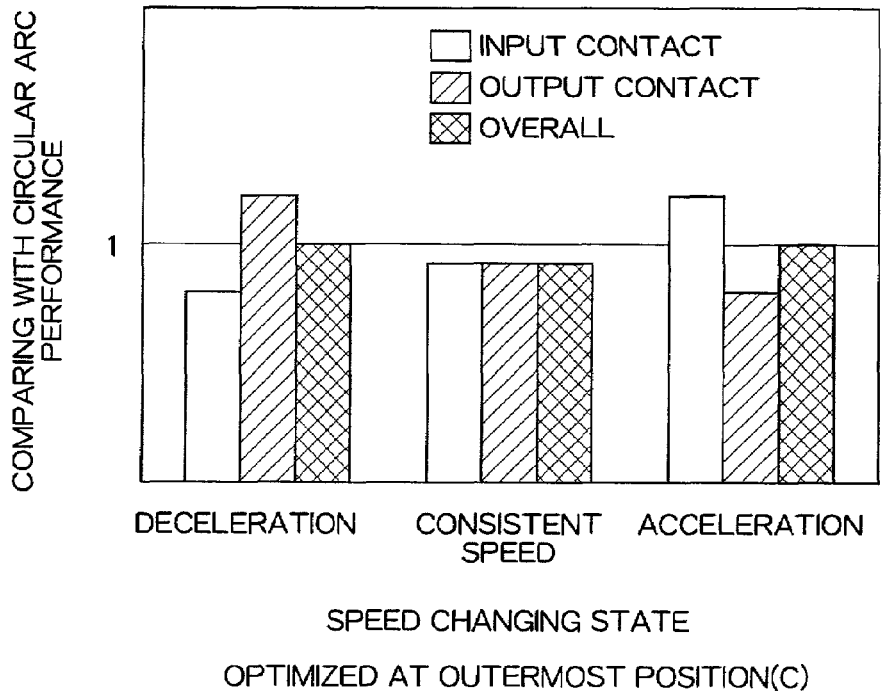
FIG. 18 is a diagram showing performance obtained using a roller the profile of which is designed at the outermost position in a full-troidal speed changing mechanism.

FIGS. 16 to 18 show characteristics obtained when the profile of a power roller in use is optimized under certain conditions. FIG. 16 shows performance, in comparison with that which would be obtained with a circular arc profile, of the speed changing mechanism, achieved in the states of deceleration, operation with a uniform velocity, and acceleration, using a power roller 28 having a profile optimized at a point A, or the innermost point among the three points A to C, where the power roller 28 contacts the input and output disks 26, 30. In the drawing, white bars relate to performance at a point of contact on the input side; striped bars relate to performance at a point of contact on the output side; and cross hatched bars relate to overall performance.

FIG. 17 shows performance achieved with optimization applied at the point B, or the middle of the contact points A to C; and FIG. 18 shows performance achieved with optimization at point C, the outermost point.

As is obvious from the drawings, preferable performance is obtained in any state of deceleration, operation with a uniform speed, and acceleration, when optimization is applied at the innermost point A. Improved overall performance cannot be seen in other cases. As described above, optimization applied at the point A, or a point with the largest width of contact aX, enables improvement of overall performance.

In the above, the profile of a roller or a function indicating the gap z is given first to obtain contact stress distribution based thereon. Alternatively, stress distribution may initially be assumed and the profile of a roller may be obtained so as to satisfy the assumption. This will be described below. In the following description, the mechanism of FIG. 1, in which the roller 10 contacts the planar surface of the disk 16 is referred to. Initially, stress distribution between the contact portions of the roller 10 and the disk 16 is assumed based on the following expression.

$$P(x, y) = P\max\{1-(y/b)^2-(x/a)^n\}^{1/2} \quad (2)$$

wherein a is the width of contact in the x axial direction and b is the width of contact in the y axial direction.

Figure 19:
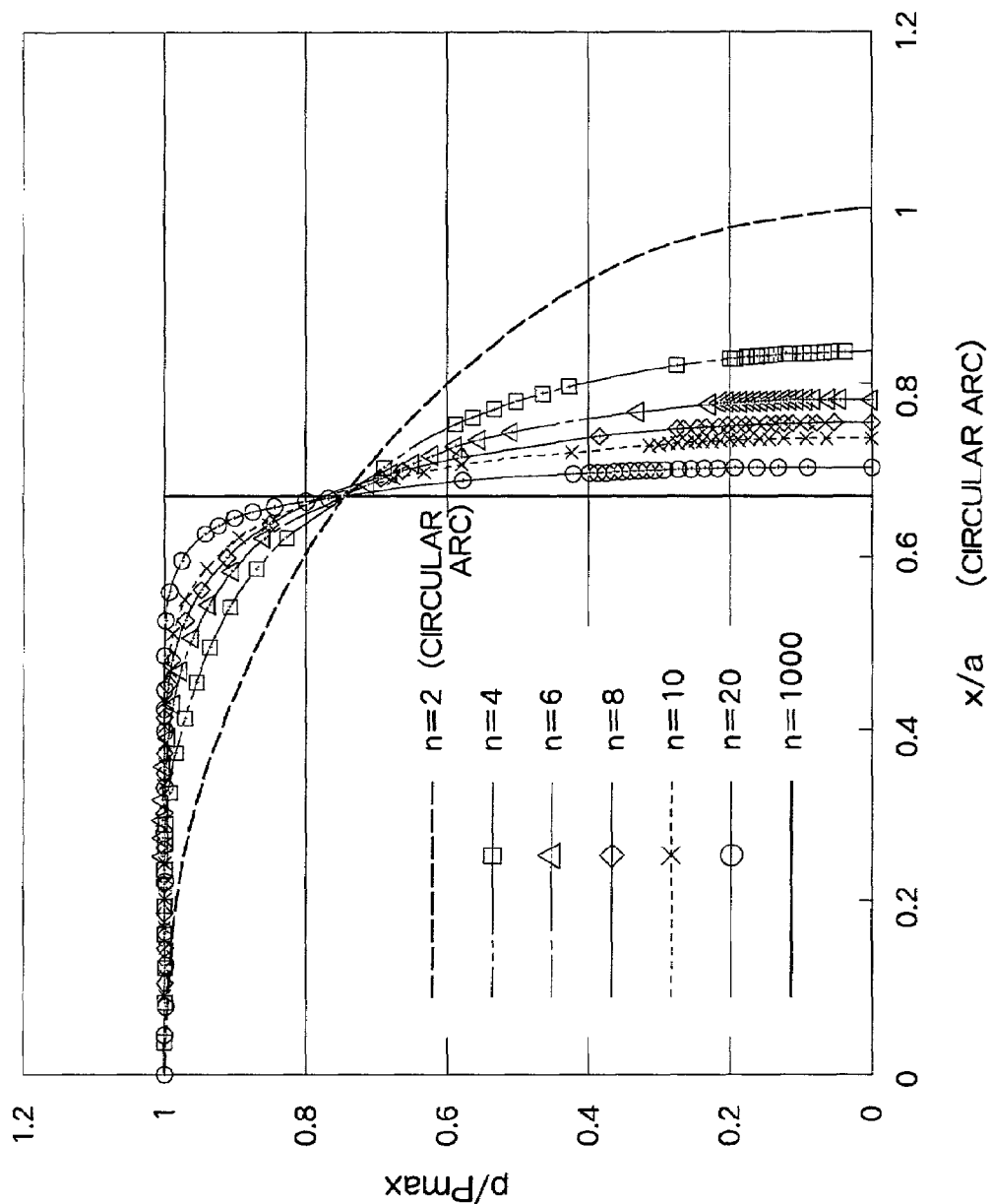
FIG. 19 is a diagram showing shapes of several exemplary contact stress distributions.

FIG. 19 is a diagram showing stress distribution patterns obtained by substituting several values for n in the above expression (2). As shown, a smaller n results in stress distribution having a circular arc shape, while a larger n results in a stress distribution pattern shaped with a flat top. Based on the stress distribution expressed by expression (2), a load W is expressed by the expression below.

$$W = \iint_{(\text{contact region})} p(x, y) dx dy \quad (3)$$

Figure 20:
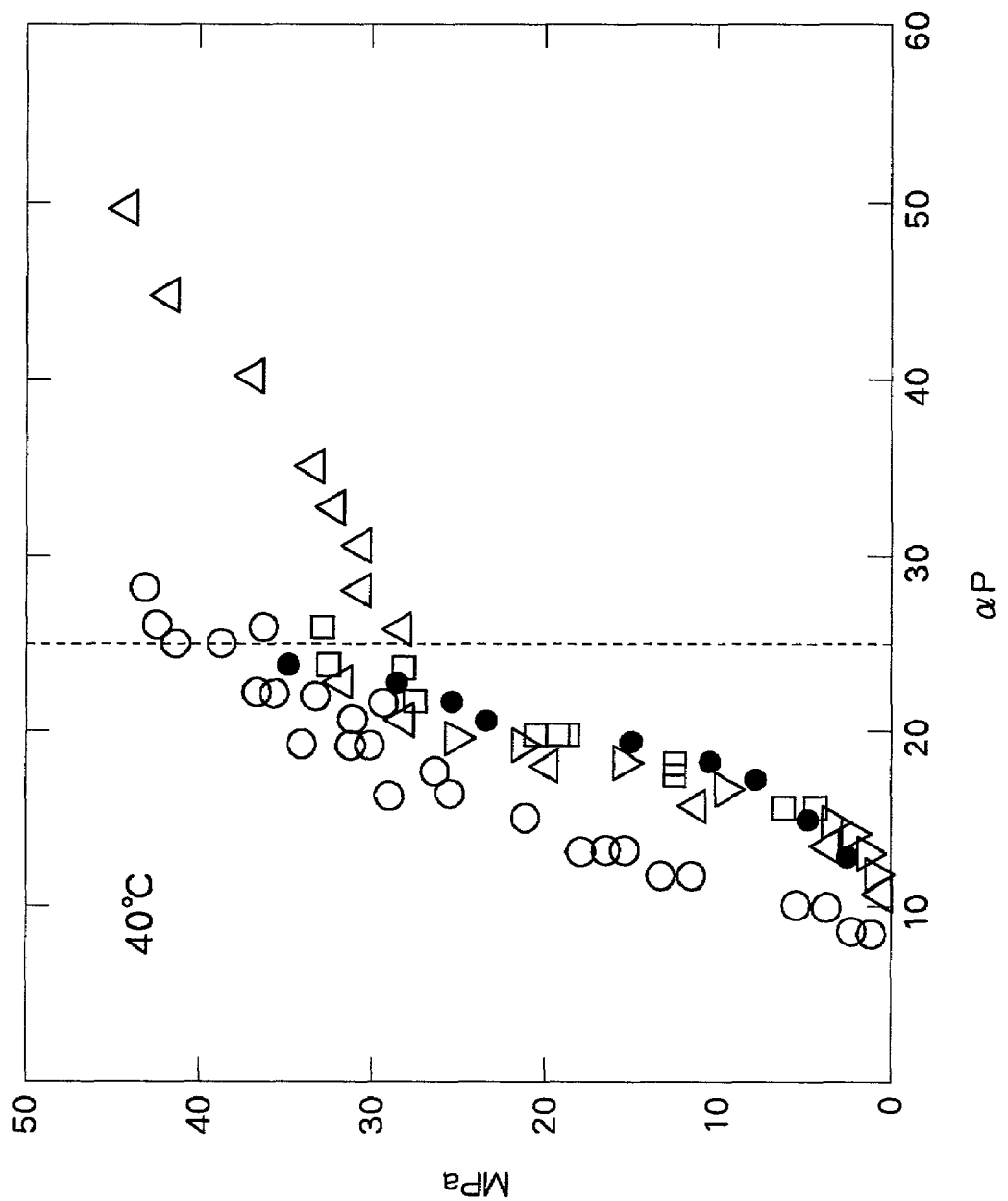
FIG. 20 is a diagram showing shear characteristics of fluid.

Here, lubricating fluid may be supplied between the roller 10 and the disk 16. Shear stress τ of the fluid may change significantly according to pressure because the fluid changes its material physics such that it presents, for example, elastic plasticity under high pressure and serves as viscosity fluid under low pressure. The magazine "JUNKATSU (Lubrication)" vol. 33, ver. 12 (1988) contains on page 922 an article by Ohno et al. concerning the boundary between an elastic plasticity region and a viscosity region. FIG. 20 is a diagram showing shear characteristics of several types of fluids. According to the graph, the product which is 25 of pressure p and a pressure index α of fluid viscosity creates a boundary between the two regions. Thus, the shear characteristics of fluid are assumed as the following expression, wherein η is viscosity under pressure p, $\eta_0$ is viscosity under atmospheric pressure, α is a pressure index of fluid viscosity, γ is a shear rate, ΔU is a shear speed, and h is a film thickness. (expression 10)

$$\tau = mp \text{ (when } \alpha p > 25\text{) elastic plasticity} \quad (4)$$

$$\tau = \tau_0 \cdot \sin h^{-1}(\eta\gamma/\tau_0) \text{ (when } \alpha p < 25\text{) viscosity} \quad (5)$$

wherein $\eta = \tau_0 \cdot \exp(\alpha p)$, $\gamma = \Delta U/h$

Figure 21:
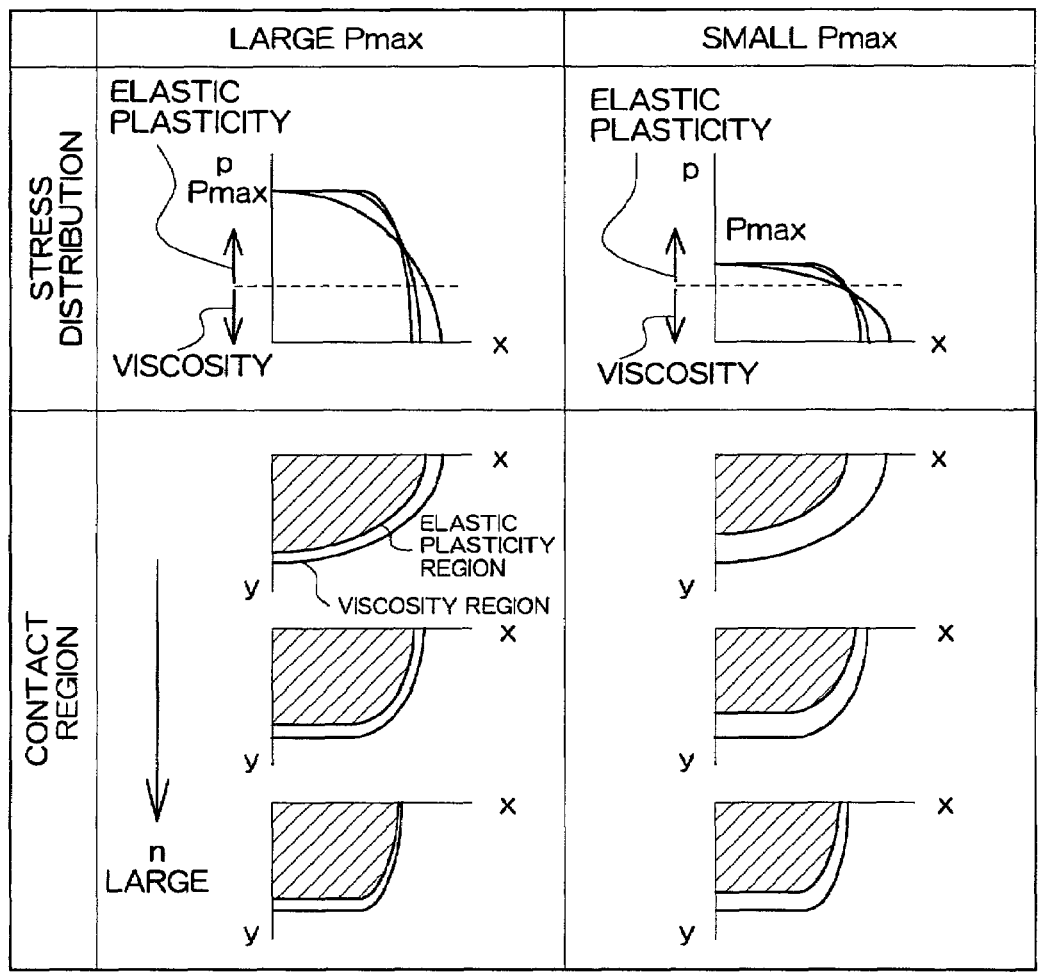
FIG. 21 is a diagram showing the state of elastic plasticity regions and viscosity regions within contact regions.

FIG. 21 shows shapes of stress distribution obtained by expression (2) with the maximum contact stress Pmax and the states of elastic plasticity regions and viscosity regions within contact regions. Elastic plasticity regions are the striped areas in the drawing, while viscosity regions are shown as white areas surrounding the elastic plasticity regions. A contact region in only one quadrant relative to the x and y axes is also shown. Stress distribution will vary depending on the value of n in expression (2), as shown in FIG. 19, and its shape presents a flat top for a larger n whether Pmax is large or small. The contact region on the x-y plane will change from oval to substantial rectangular as n becomes larger. For small Pmax, the proportion of the elastic plasticity region present within the contact region decreases.

The magnitude of a force T (hereinafter referred to as traction) to be transmitted between the disk 16 and the roller 10 is of a value obtained by integrating the shear stress in the y axial direction in the contact region and expressed by expression (6). Transmission loss Ploss in the transmission is expressed as the following expression.

$$T = \iint_{(\text{contact region})} \tau(x, y) \cdot (\Delta uy/\Delta U) dx dy \quad (6)$$

$$Ploss = \iint_{(\text{contact region})} \tau(x, y) \cdot \Delta U dx dy \quad (7)$$

Figure 22:
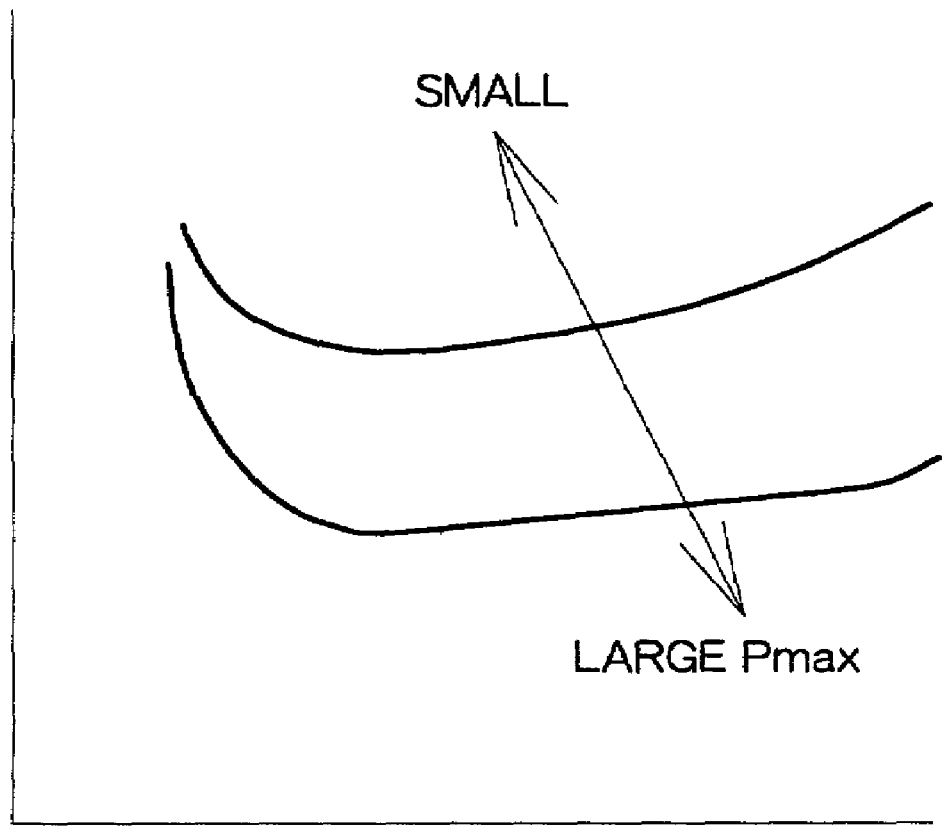
FIG. 22 is a diagram showing relationship between n and a transmission loss.
Figure 23:
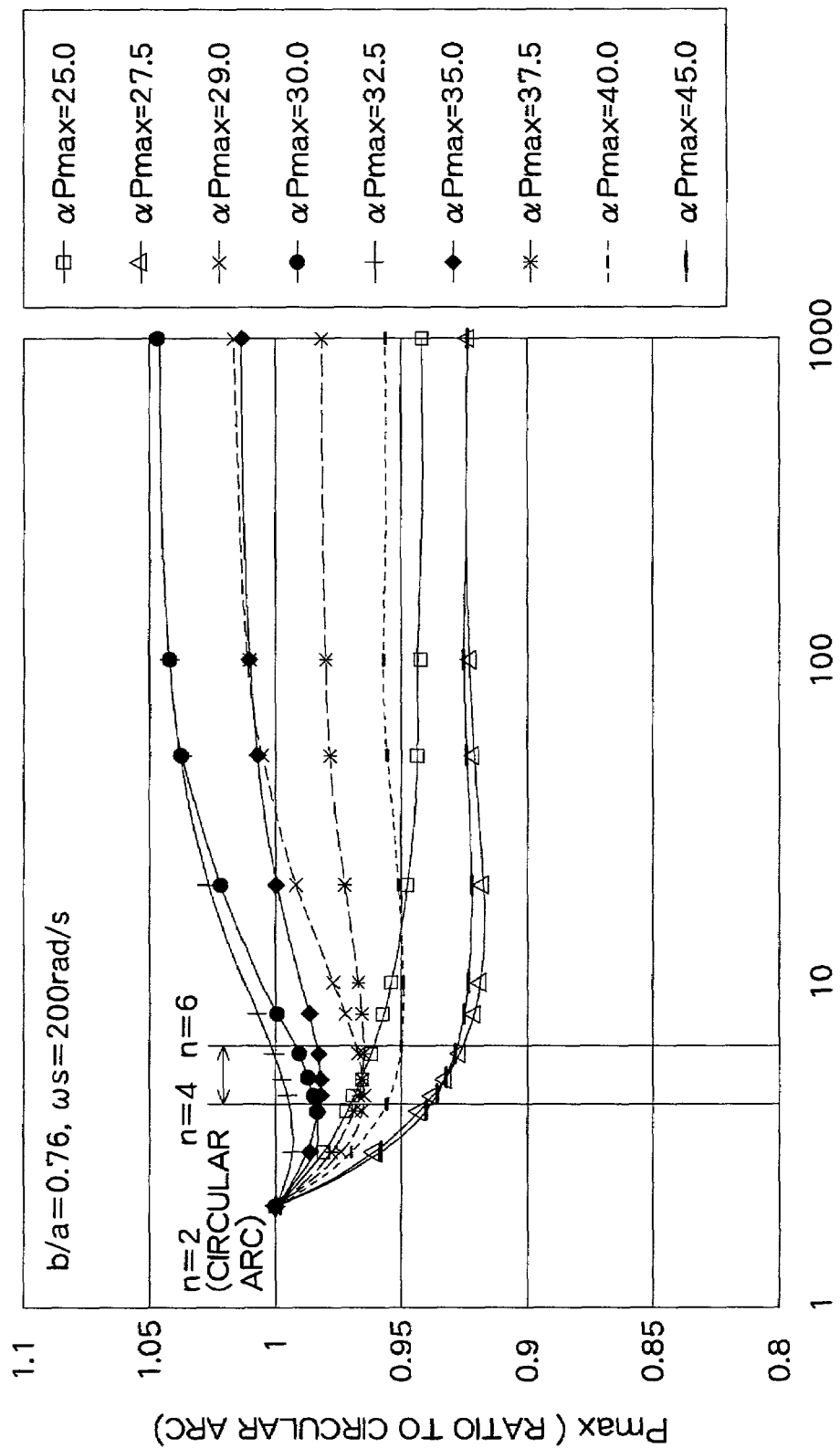
FIG. 23 is a diagram showing reduction of a maximum contact stress, in particular, in a full-troidal speed changing mechanism.
Figure 24:
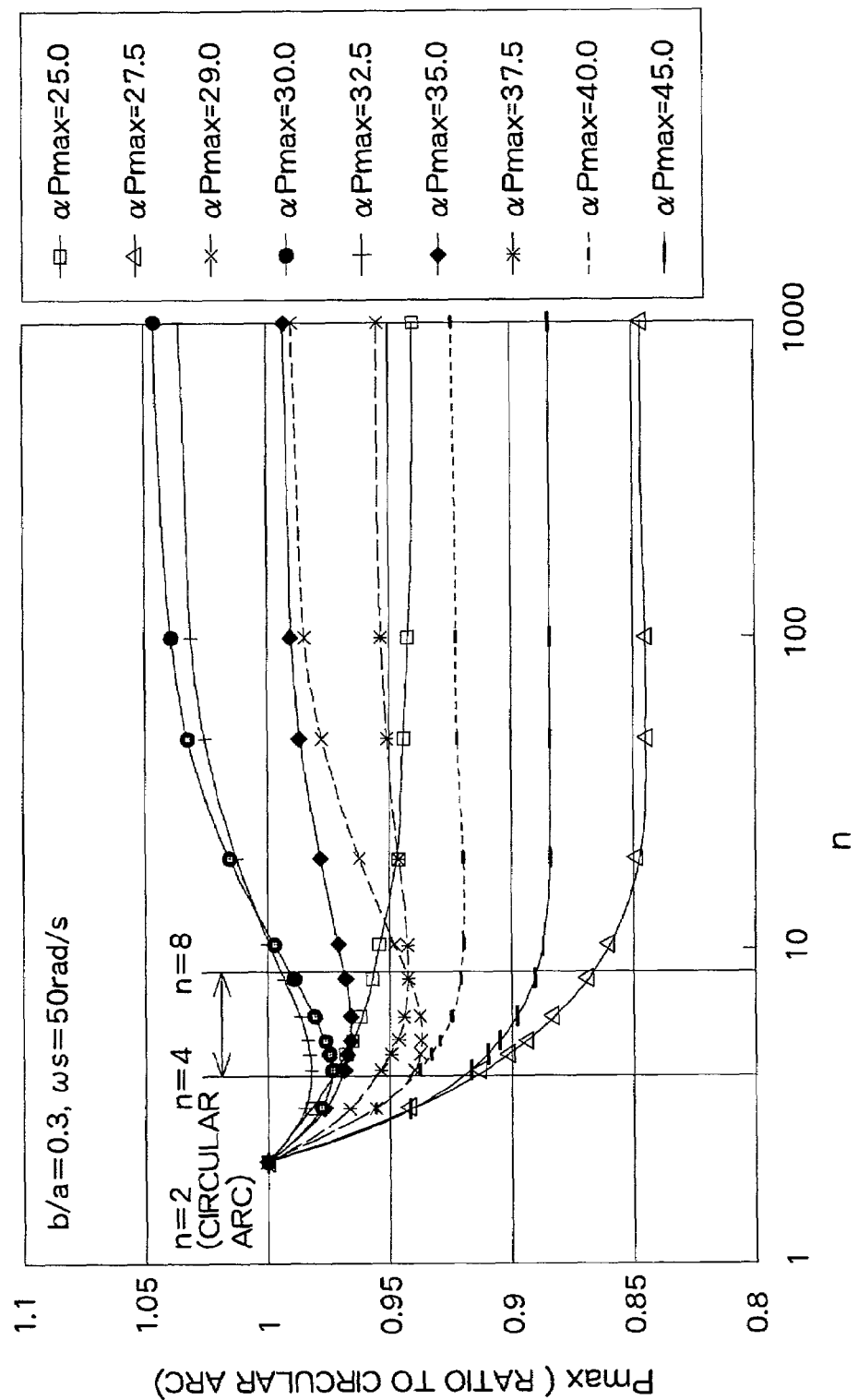
FIG. 24 is a diagram showing reduction of a maximum contact stress, in particular, in a half-troidal speed changing mechanism.
Figure 25:
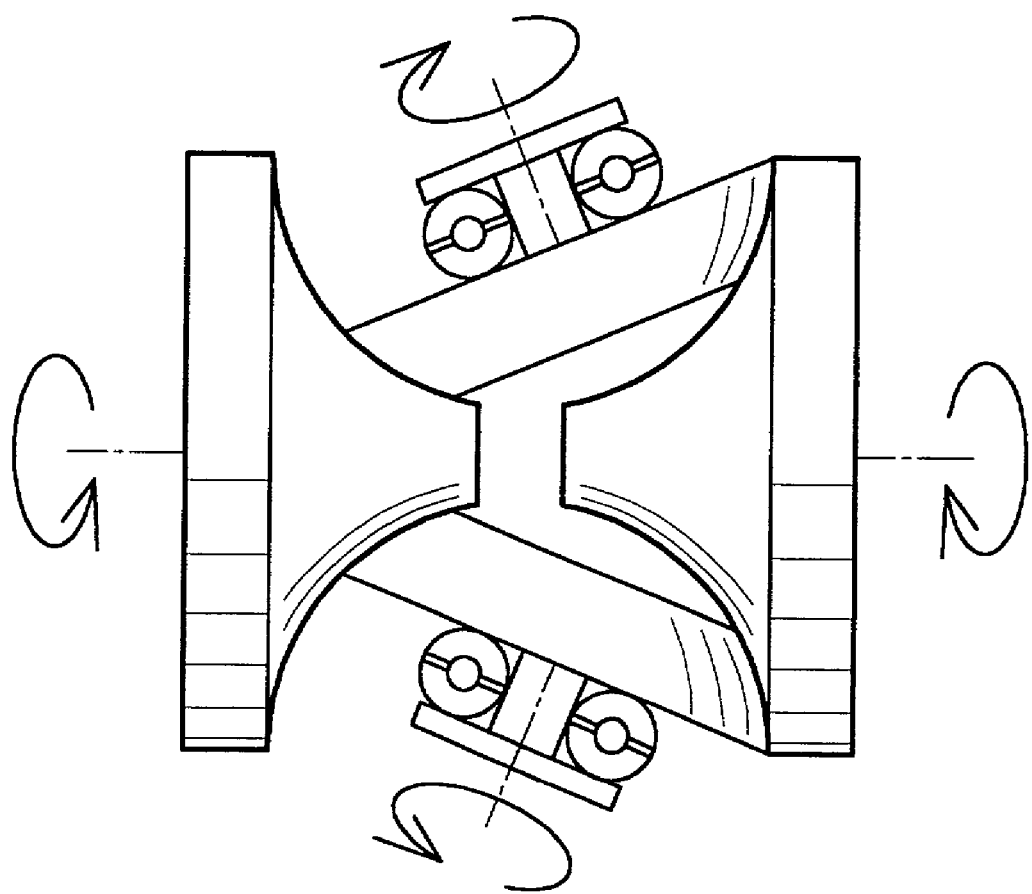
FIG. 25 is a diagram schematically showing a half-troidal speed changing mechanism.

FIG. 22 is a diagram showing changes of transmission losses Ploss relative to values of n for large and small maximum contact stresses Pmax. It can be seen from the diagram that there is an n of a value which minimizes the transmission loss Ploss for each value of maximum contact stresses Pmax. In order to obtain this value of n, expressions (2), (4), and (5) are substituted into expressions (3), (6), and (7) to obtain the relationship between n and a traction coefficient with identical maximum contact stress Pmax and transmission efficiency. The reciprocal of the increasing rate of a traction coefficient relative to a circular arc profile (n=2) with identical efficiency corresponds to a decreasing rate of the maximum contact stress Pmax. Plotting the decreasing rate of the maximum contact stress against n provides FIGS. 23 and 24. The relationship between n and the maximum contact stress Pmax depends on αPmax, a spin angular speed ωs, and an aspect ratio (b/a) of the contact region. FIG. 23 relates to a full-troidal speed changing mechanism as shown in FIG. 8, while FIG. 24 relates to a half-troidal speed changing mechanism as shown in FIG. 25. Maximum contact stress reduction effect is admitted in the drawing at n=3 to 6 for a full-troidal type and n=3 to 10 for a half-troidal type.

Figure 26:
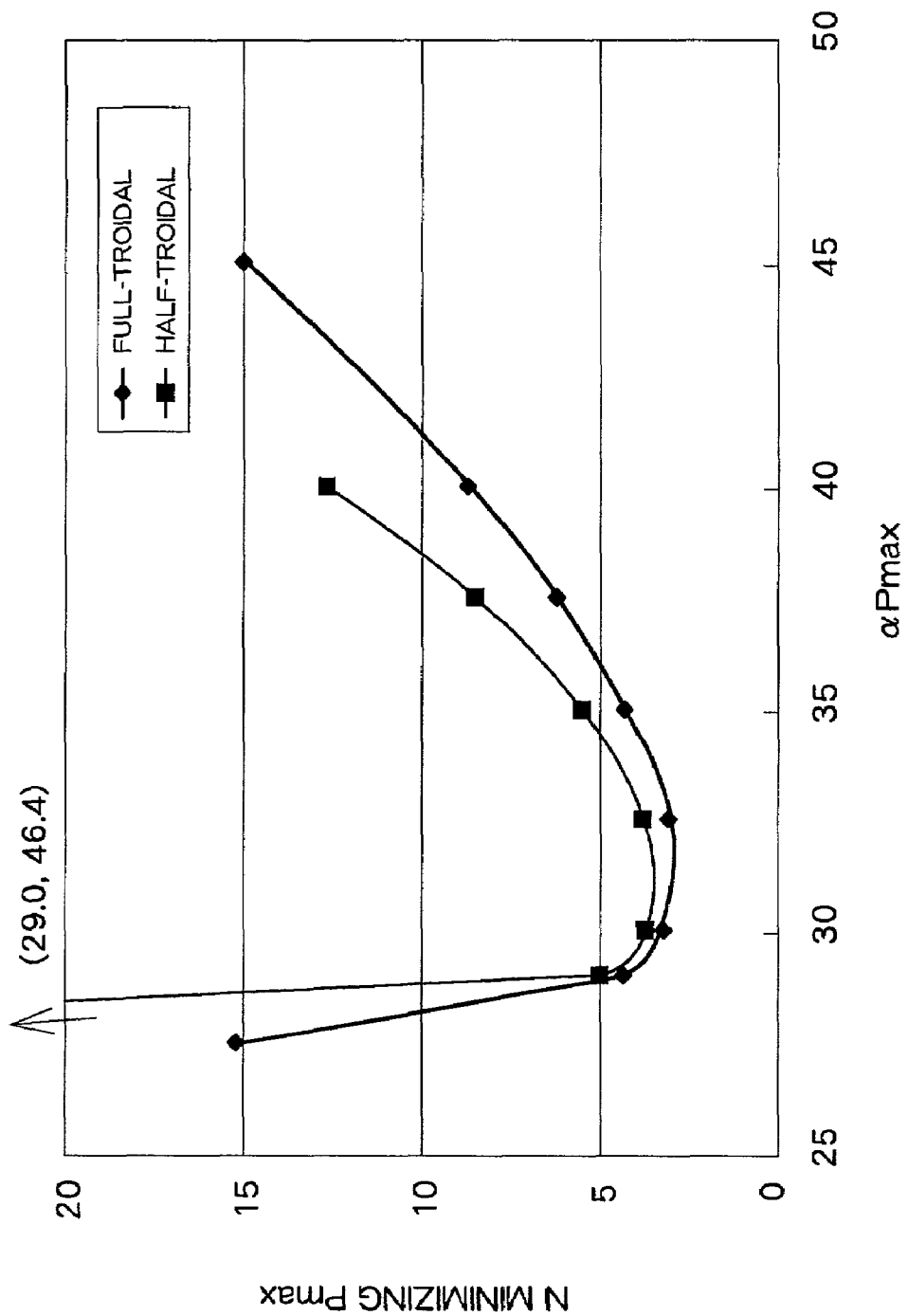
FIG. 26 is a diagram showing relationship between $\alpha P\max$ and n for minimizing Pmax.

While the spin angular speed ωs and aspect ratio (b/a) are fixed, the optimum value of n is given in the form of a function of αPmax, as shown in FIG. 26.

Figure 27A:
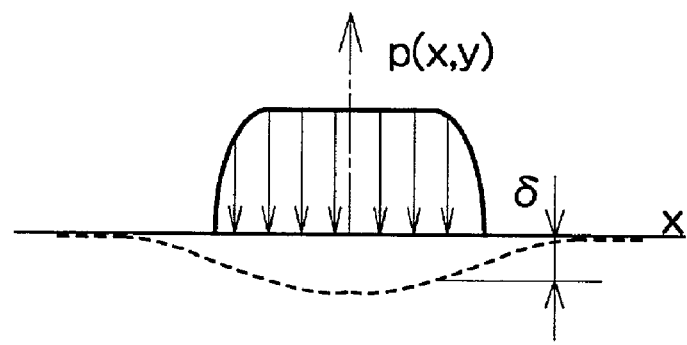
FIGS. 27A, 27B and 27C are diagrams describing a method for obtaining a roller profile based on stress distribution.

Once a preferable value for n is determined, associated stress distribution can be computed as shown in FIG. 19. Then, the surface profile of the roller 10 which can realize that stress distribution is obtained. As shown in FIG. 27A, when a distribution load p (x, y) capable of causing stress distribution obtained as above is applied to a planar surface corresponding to the surface of the disk 16, the planar surface is caused to have deformation δ expressed as the following expression.

$$\delta(0, x) = \frac{2}{\pi E} \iint \frac{p(\xi, \eta)}{\sqrt{(0-\xi)^2 + (x-\eta)^2}} d\xi d\eta \quad (8)$$

wherein ξ is an x axial coordinate within a contact region, and η is a y axial coordinate within a contact region.

Figure 27B:
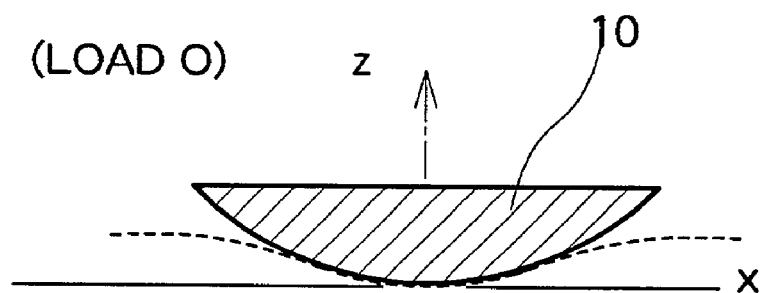

The gap z between the disk 16 and the roller 10 when the roller 10 contacts the disk 16 as being applied by a load 0, as shown in FIG. 27B, governs the profile of the roller as expressed by the following expression. Note that the broken lines in FIGS. 27A and 27B are of identical shape.

$$Z(x) = \delta(0, x) - \delta(0, 0) \quad (9)$$

Figure 27C:
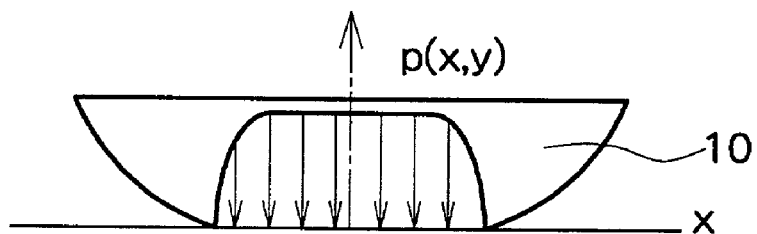

When the roller 10 having a profile expressed by expressions (8) and (9) is pressed onto the disk 16 by a load W which is identical to that used in computation of stress distribution, stress distribution identical to that of FIG. 27A is attained, as shown in FIG. 27C, wherein the gap z can be approximated using the following quartic expression.

$$z = C_4 x^4 + C_3 x^3 + C_2 x^2 \quad (10)$$
$$\text{wherein } C_4 = (-0.00002n^4 + 0.0017n^3 - 0.058n^2 + 0.89n - 2.113) \times C_0$$
$$C_3 = (-0.0018n^3 + 0.064n^2 - 1.0754n + 3.7603) \times C_0$$
$$C_2 = (1.894n^{-0.574} - C_4 - C_3) \times C_0$$
$$C_0 = \frac{2aP\max}{\pi E}$$

Figure 28:
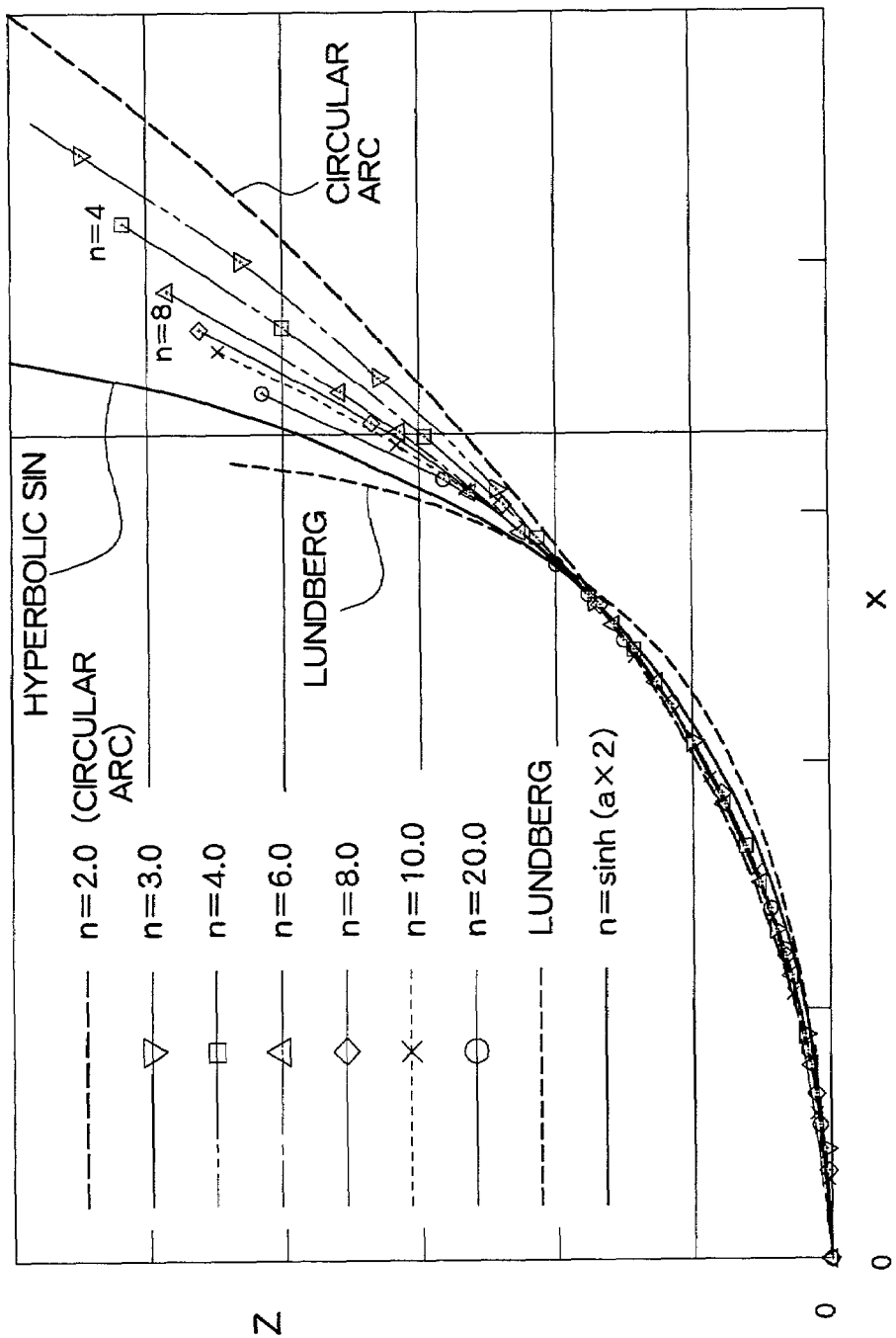
FIG. 28 is a diagram showing several exemplary profiles of a roller.

FIG. 28 is a diagram showing exemplary profiles of the roller 10 in the width direction. A roller profile obtained as a result of the above procedure is asymptotic to the hyperbolic sine profile described above with n being infinite. Meanwhile, it is known from FIG. 23 that when αPmax>45, that is, when substantially the entire contact region is occupied by an elastic plasticity region, n being infinite offers largest reduction effect to the the maximum contact stress Pmax. This proves that the above description also includes a hyperbolic sine case. It should be noted that, when the surface of a disk is not a planar, as in the case of a troidal speed changing mechanism, differing from the above in which the disk 16 has a planar surface, the profile of the contact portion of the roller is formed such that the relative gap between the disk and the roller is expressed by an expression such as expression (10).

What is claimed is:

1. A friction transmission unit having an input member and an output member in rolling contact with the input member, for transmitting rotation of the input member to the output member by means of friction force, wherein, a function indicating a gap in a direction (z) which is formed between the input member and the output member when the input member and the output member are assumed to contact each other at a point, the gap (z) being on a plane perpendicular to a vector indicating friction force caused between the input member and the output member, is expressed as $$z = a \cdot \sin h(bx^2)$$

(x) being a distance from the point at which the input member is assumed to contact the output member along a tangent of the input member passing through the point, and (a) and (b) being constants.

2. A friction transmission unit having an input member and an output member in rolling contact with the input member, for transmitting rotation of the input member to the output member by means of friction force, wherein, a function indicating a gap in a direction (z) which is formed between the input member and the output member when the input member and the output member are assumed to contact each other at a point, the gap (z) being on a plane perpendicular to a vector indicating friction force caused between the input member and the output member, is expressed as $$z = C_4 x^4 + C_3 x^3 + C_2 x^2$$

wherein $C_4 = (-0.00002n^4 + 0.0017n^3 - 0.058n^2 + 0.89n - 2.113) \times C_0$
$C_3 = (-0.0018n^3 + 0.064n^2 - 1.0754n + 3.7603) \times C_0$
$C_2 = (1.894n^{-0.574} - C_4 - C_3) \times C_0$
$C_0 = 2a\, P\max/\pi E$
$3 < n < 6$ (full-troidal)
$3 < n < 10$ (half-troidal)

(x) being a distance from the point at which the input member is assumed to contact the output member along a tangent passing through the point.

3. The friction transmission unit according to claim 1, wherein the point of contact between the input member and the output member is a point between the input member and the output member where a curvature radius of at least one of the input member and the output member in a direction along a vector indicating friction force between the input member and the output member is minimized.

4. The friction transmission unit according to claim 3, wherein a contact surface of one of the input member and the output member is a toroidal surface, and the point of contact is innermost in a radius direction of rotation within a range wherein the other member contacts the contact surface which is the toroidal surface.

* * * * *